(12) United States Patent
Kaneko

(10) Patent No.: US 8,368,704 B2
(45) Date of Patent: Feb. 5, 2013

(54) GRAPHIC PROCESSOR AND INFORMATION PROCESSING DEVICE

(75) Inventor: Motoi Kaneko, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 947 days.

(21) Appl. No.: 11/813,944

(22) PCT Filed: May 8, 2006

(86) PCT No.: PCT/JP2006/309262
§ 371 (c)(1),
(2), (4) Date: Sep. 10, 2007

(87) PCT Pub. No.: WO2006/123546
PCT Pub. Date: Nov. 23, 2006

(65) Prior Publication Data
US 2008/0211803 A1    Sep. 4, 2008

(30) Foreign Application Priority Data
May 20, 2005    (JP) .................................. 2005-148229

(51) Int. Cl.
*G06T 1/00*    (2006.01)
(52) U.S. Cl. ........................................ 345/522
(58) Field of Classification Search .................. 345/522
See application file for complete search history.

(56) References Cited

U.S. PATENT DOCUMENTS

| | | | | |
|---|---|---|---|---|
| 5,675,773 A * | 10/1997 | Devic | ............................. | 345/522 |
| 5,943,057 A | 8/1999 | Ohba | | |
| 6,624,819 B1 * | 9/2003 | Lewis | ............................ | 345/561 |
| 6,867,781 B1 * | 3/2005 | Van Hook et al. | ............. | 345/506 |
| 7,038,685 B1 * | 5/2006 | Lindholm | ..................... | 345/501 |

FOREIGN PATENT DOCUMENTS

| | | |
|---|---|---|
| JP | 06-187457 | 7/1994 |
| JP | 09-035084 | 2/1997 |
| JP | 11-133943 | 5/1999 |

OTHER PUBLICATIONS

International Search Report dated Aug. 1, 2006.
International Preliminary Report on Patentability and Written Opinion of the International Searching Authority dated Nov. 23, 2007, for the corresponding International Application PCT/JP2006/309262.

* cited by examiner

*Primary Examiner* — Edward Martello
(74) *Attorney, Agent, or Firm* — Katten Muchin Rosenman LLP

(57) ABSTRACT

This invention provides a command system for efficiently performing information processing.
An information processing apparatus 1000 includes a main processor 200 which exercises centralized control on the entire apparatus, a graphic processor 100 which performs image processing operations, and a main memory 50. The graphic processor 100 includes a control unit 20 which exercises centralized control on the graphic processor, and a graphic operation unit 40 which performs graphic processing in accordance with a command given through the control unit. The control unit 20 includes: an interface part 22 which exchanges data with the main processor 200; a command analysis part 24 which analyzes a command system included in data received from the main processor, the command system including a set of non-graphic processing type commands; and an execution part 26 which executes analyzed commands.

22 Claims, 14 Drawing Sheets

FIG.2

| TYPE | ATTRIBUTE | COMMAND ID | PARAMETER 1 | PARAMETER 2 | PARAMETER 3 |
|---|---|---|---|---|---|
| 121 | 122 | 123 | 124 | 125 | 126 |

| | TYPE | ATTRIBUTE | ID | |
|---|---|---|---|---|
| 701 | DMA | | 1 | Tex A |
| 702 | DMA | | 2 | Tex B |
| 703 | SYNC | D F | 1 | SPU A |
| 704 | KICK | | 1 | Obj A |
| 705 | SYNC | D F | 2 | SPU B |
| 706 | KICK | | 2 | Obj B |
| 707 | SYNC | K | 1 | Obj A |
| 708 | NOTIFY | | 1 | SPU A |
| 709 | DMA | | 3 | Tex A |
| 710 | SYNC | D F | 3 | SPU A |
| 711 | KICK | | 3 | Obj A |
| 712 | SYNC | K | 2 | Obj B |
| 713 | NOTIFY | | 2 | SPU B |
| 714 | DMA | | 4 | Tex B |
| 715 | SYNC | D F | 4 | SPU B |
| 716 | KICK | | 4 | Obj B |
| 717 | WAIT | | | |
| 718 | NOTIFY | | | SPU all |

700

750

GRAPHIC PROCESSOR AND INFORMATION PROCESSING DEVICE

TECHNICAL FIELD

The present invention relates to a graphic processor or an information processing apparatus, and more particularly to an information processing technology that includes image processing.

BACKGROUND TECHNOLOGY

With the development of computer graphics technologies in recent years, image data to be output from information processing apparatuses such as mainframe computers, personal computers, and game consoles are becoming complex and sophisticated. These information processing apparatuses have now implemented a graphic processor dedicated to image processing, aside from their main processors for performing ordinary processing, so that the main processors are released from performing the image processing to resolve system overhead.

In order for these information processing apparatuses to achieve high-performance processing, it is useful for their main processors to be multiprocessors. In a multiprocessor, a plurality of tasks is assigned to respective processors for parallel processing, providing an increase in the operation speed. At the same time, the graphic processor must perform image processing at a speed corresponding to the speed at which the plurality of tasks are processed by the main processor, so as to correspond to the high-speed operation of the main processor.

DISCLOSURE OF THE INVENTION

In general, the graphic processor performs image processing irrespective of application programs executed by the main processor. Nevertheless, it may be possible to contribute to an improved processing efficiency of the information processing apparatus if the operation of the graphic processor can be controlled in coordination with the image processing that is required in executing the applications.

The present invention has been developed in view of the foregoing problem. It is thus a general purpose thereof to provide a technology for performing information processing with image processing operations efficiently.

One aspect of the present invention relates to a graphic processor. This graphic processor includes: a control unit which exercises centralized control on the graphic processor; and a graphic unit which performs graphic processing in accordance with a command given through the control unit. Then, the control unit further includes: an interface part which exchanges data with an external unit; a command analysis part which analyzes a command system included in data received from the external unit, the command system including a set of non-graphic processing type commands; and an execution part which executes analyzed commands.

The "non-graphic processing type commands" herein refers to commands that explicitly describe a data transfer, a start of graphic processing, wait, end, and the like of processing, not ones that explicitly describe the details of graphic processing of the graphic unit. According to this aspect, users can control the operation of the graphic processor by combining non-graphic processing type commands, thereby improving processing efficiency.

The command system may also be a system which encapsulates and handles graphic processing to be performed by the graphic unit. The "system which encapsulates and handles" herein refers to a system that includes both data and a procedure for performing an operation on the data.

The command system may include commands which do not directly manipulate data pertaining to a graphic operation to be performed by the graphic unit. The "data pertaining to graphic processing" herein may include texture data, color data, α value data, Z value data, vertex data, and the like, as well as programs such as a shader program of the graphic unit. This prevents the non-graphic processing type commands from affecting the result of the graphic processing.

The command system may include commands that explicitly describe a target of the graphic processing to be performed by the graphic unit but do not explicitly describe the details of processing. The "target of graphic processing" refers to an object in an embodiment of the invention, and "the details of processing" refers to a program such as a shader program of the graphic unit.

Moreover, the command system may include global operation instructing commands which are independent of the details of the graphic processing to be performed by the graphic unit. The "global operation instructing commands" refer to commands that pertain to an operational control on the graphic unit and are free from the influence of programs to be run on the graphic unit, such as a shader program. This eliminates the need to revise the command system even if the programs to be run on the graphic unit are changed.

The command analysis part may transfer data necessary for graphic processing out of the data received from the main processor to a storage area accessible by the graphic unit. The data necessary for graphic processing includes texture data, color data, α value data, Z value data, vertex data, and the like. This storage area may be provided in the graphic unit, or provided outside the graphic unit.

Another aspect of the present invention relates to an information processing apparatus. This information processing apparatus includes: a main processor which exercises centralized control on the entire apparatus; and a graphic processor which performs an image processing operation. The graphic processor includes: a control unit which exercises centralized control on the graphic processor; and a graphic unit which performs graphic processing in accordance with a command given through the control unit. The control unit includes: an interface part which exchanges data with the main processor; a command analysis part which analyzes a command system included in data received from the main processor, the command system including a set of non-graphic processing type commands; and an execution part which executes analyzed commands.

According to this aspect, users can also control the operation of the graphic processor by combining non-graphic processing type commands, thereby improving processing efficiency.

It should be appreciated that any combinations of the foregoing components and any conversions of expressions of the present invention from/into methods, apparatuses, systems, computer programs, and the like are also intended to constitute applicable aspects of the present invention.

According to the present invention, the operation of the graphic processor for performing image processing can be controlled with a small number of commands.

BRIEF DESCRIPTION OF THE DRAWINGS

FIG. 2 is a diagram showing an example of a command format;

FIG. 11 is a diagram showing an example of a command list when the graphic memory has two buffers;

Figure 1:
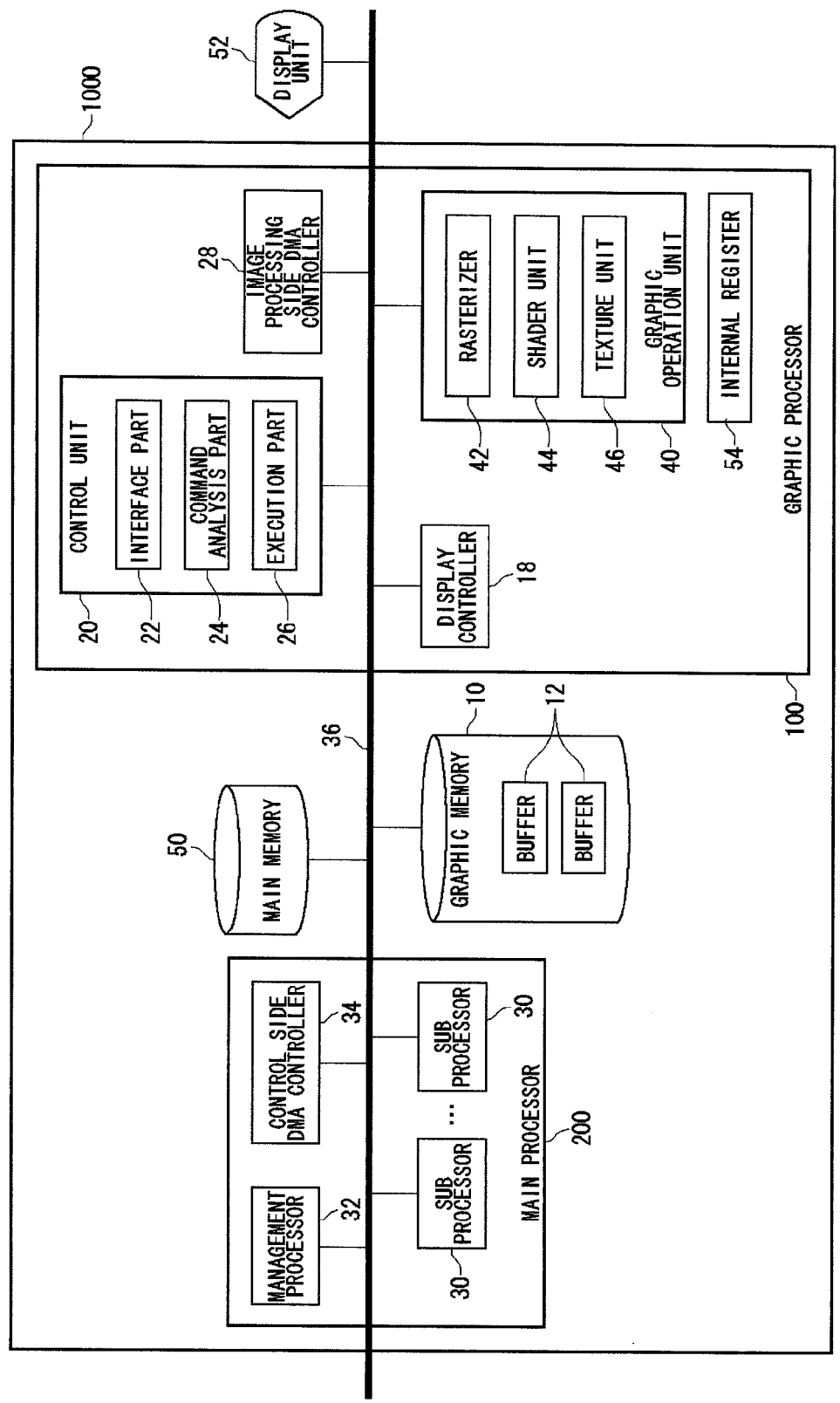
FIG. 1 is a block diagram showing a configuration of an information processing apparatus according to one embodiment of the present invention.

EXPLANATION OF REFERENCE NUMERALS 10 graphic memory, 12 context buffer, 18 display controller, 20 control unit, 22 interface part, 24 command analysis part, 26 execution part, 28 image processing side DMA controller, 30 sub processor, 32 management processor, 34 control side DMA controller, 40 graphic operation unit, 42 rasterizer, 44 shader unit, 46 texture unit, 50 main memory, 52 display unit, 54 internal register, 100 graphic processor, 200 main processor, and 1000 information processing apparatus.

BEST MODE FOR CARRYING OUT THE INVENTION

FIG. 1 is a block diagram showing a configuration of an information processing apparatus 1000 according to an embodiment of the present invention. The information processing apparatus 1000 includes a graphic processor 100, a main processor 200, a main memory 50, and a graphic memory 10. The information processing apparatus 1000 is connected to a display unit 52. It should be appreciated that in FIG. 1, the individual elements shown as functional blocks for performing various kinds of processing can be constituted, in terms of hardware, by CPUs, memories, and other LSIs. In terms of software, they can be achieved by programs and the like loaded on a memory. It will thus be understood by those skilled in the art that these functional blocks may be achieved in various forms including hardware alone, software alone, and a combination of these, and they are not limited to any one of them.

An operating system (hereinafter abbreviated to as OS) runs on the information processing apparatus 1000. OS provides functions and environment for efficient use of the information processing apparatus 1000, and exercises centralized control on the entire apparatus. Application software (hereinafter referred to simply as applications) runs on the OS. In the present embodiment, the main processor 200 and the graphic processor 100 perform processing in a coordinated manner. The graphic processor 100 performs image processing pertaining to each of tasks processed by the main processor 200, and outputs generated images and pictures to the display unit 52 or stores them into a storage device (not-shown). The coordinated operation of the main processor 200 and the graphic processor 100 will be described later.

The main processor 200 includes a plurality of sub processors 30, a management processor 32, and a control side DMA (Direct Memory Access) controller 34. The sub processors 30, the management processor 32, and the control side DMA controller 34 can communicate with each other through a bus 36. The management processor 32 time-shares tasks corresponding to the applications, assigns the tasks corresponding to the respective applications to the sub processors 30 time-slice by time-slice, and controls the operations to be performed in parallel. For example, if the task corresponding to an application to be processed in a certain time slice pertains to image processing of three-dimensional computer graphics, geometry processing will be executed. When the sub processors 30 come to require image processing, geometry-processed vertex data and parameter data are transferred from the respective sub processors 30 to the graphic memory 10.

The control side DMA controller 34 controls data transfer, data save, and the like to and from the main memory 50 and the graphic processor 100 based on commands from the sub processors 30 or the management processor 32.

The main memory 50 is a storage area to be used primarily by the main processor 200. This main memory 50 temporarily stores data, programs, and the like that are obtained by the main processor 200 processing tasks pertaining to computer graphics. In addition, data resulting from the processing of the graphic processor 100 may sometimes be saved and stored into the main memory 50.

The graphic memory 10 is a memory area dedicated to graphics-related data to be used and managed by the graphic processor 100. In addition to a frame buffer (not shown) and the like for storing image frame data, the graphic memory 10 has buffers (not shown) for storing vertex data, or basic data to be referred to when drawing the image frame data, and two context buffers 12 for storing texture data temporarily.

The graphic processor 100 performs image-related processing such as rendering. The graphic processor 100 includes a display controller 18, a control unit 20, an image processing side DMA controller 28, a graphic operation unit 40, and an internal register 54. These blocks are connected to each other with the bus 36, and data signals are transmitted and received between the individual blocks.

The graphic operation unit 40 performs various kinds of graphics-related processing according to commands given from an external unit. Examples of the processing include a series of rendering processes in which image frame data is generated by performing a coordinate transformation, hidden surface elimination, and shading based on three-dimensional modeling data, and is written to the frame buffer in the graphic memory 10. In order to perform processing pertaining to three-dimensional graphics at high speed, the graphic operation unit 40 includes such functional blocks as a rasterizer 42, a shader unit 44, and a texture unit 46.

The rasterizer 42 receives vertex data of an object to be drawn, and performs a view transformation for transforming the object in a three-dimensional space into a figure on the drawing plane through a projection transformation. It also performs raster processing of scanning the figure on the drawing plane along the horizontal direction of the drawing plane while transforming it into quantized pixels row by row. This rasterizer 42 develops the object into pixels, and calculates pixel information on each of the pixels. This pixel information includes RGB color values, an a value which indicates transparency, and a Z value which indicates the depth from the point of view.

The rasterizer 42 generates pixel areas of predetermined size along the scan lines, and outputs them to the shader unit 44 and the texture unit 46. The pixel areas output from the rasterizer 42 are once stacked in a queue, and the shader unit 44 processes the stacked pixel areas in order.

The shader unit 44 performs shading based on the pixel information calculated by the rasterizer 42, and determines pixel colors after texture mapping based on texel information obtained by the texture unit 46. It writes image frame data after the shading into the frame buffer in the graphic memory 10. The shader unit 44 also performs such processing as fogging and alpha blending on the image frame data written in the frame buffer, thereby determining final drawing colors to update the image frame data in the frame buffer.

The texture unit 46 receives parameters for specifying texture data from the shader unit 44, reads the requested texture data from the buffers 12 in the graphic memory 10, and performs predetermined processing before outputting it to the shader unit 44.

The control unit 20 is a block for controlling the entire graphic processor 100. The control unit 20 exercises centralized control on the display controller 18 and the graphic operation unit 40, and carries out a synchronization management on data transfer between the individual blocks, interrupt processing, a timer management, and so on.

The display controller 18 generates horizontal and vertical synchronizing signals, and reads lines of pixel data on image frame data from the frame buffer in the graphic memory 10 successively according to the display timing of the display unit 52. The display controller 18 also converts the pixel data read in lines from the format of digital data consisting of RGB color values into one corresponding to the display unit 52, and outputs the same.

The image processing side DMA controller 28 controls data transfer, data save, and the like to and from the main memory 50 and the graphic memory 10 based on commands from the control unit 20. The image processing side DMA controller 28 transfers texture data from the main memory 50 to the buffers 12 of the graphic memory 10.

Next, a description will be given of the operation of the information processing apparatus 1000 having the foregoing configuration. The coordinated operation of the main processor 200 and the graphic processor 100 will be mainly described, which is one of the characteristics of the present embodiment.

The management processor 32 of the main processor 200 determines the order of execution of temporally-divided tasks, and assigns the tasks to the sub processors 30 as appropriate. The management processor 32 also performs signal transmission and reception to and from the graphic processor 100. The control unit 20 of the graphic processor 100 performs signal transmission and reception to and from the main processor 200. In addition to this, the control unit 20 exercises centralized control over the image processing side DMA controller 28 and the graphic operation unit 40 based on command lists received from the main processor 200. According to commands executed by the control unit 20, the graphic operation unit 40 starts various types of graphic processing, as mentioned above.

The control unit 20 includes an interface part 22, a command analysis part 24, and an execution part 26. The interface part 22 receives data from the sub processors 30 in the main processor 200, the main memory 50, and the like. The term "data" herein includes a shader program and the like in the graphic operation unit 40, aside from data in the narrower sense of the word such as command lists, vertex data, and texture data. The command analysis part 24 extracts command lists from the data received by the interface part 22, and analyzes the commands. The execution part 26 executes the commands in succession.

According to processing methods defined by programs such as the shader program, the graphic operation unit 40 executes graphic processing of objects at timings designated by the commands executed by the execution part 26.

When a sub processor 30 processing a task requires image processing, the sub processor 30 temporarily stores object data, such as vertex data, that is necessary for the image processing in main memory 50, and creates configuration data and a command list for transferring the data. The configuration data includes the addresses and transfer sizes of programs, such as the shader program, to be used by the graphic operation unit 40.

The control side DMA controller 34 reads the object data from the main memory 50, and applies a perspective transformation and the like thereto before it transfers the read object data to the graphic memory 10. The control side DMA controller 34 also transfers the command list and the configuration data to the control unit 20. The data transferred to the control unit 20 is analyzed by the command analysis part 24, and the analyzed commands are passed to the execution part 26 and put into a queue. The execution part 26 executes the commands in the queue in succession. According to the executed commands, the image processing side DMA controller 28 reads texture data from the main memory 50 and transfers it to the buffers 12.

The control side DMA controller 34 starts execution in response to instruction from the management processor 32 or the sub processor 30. The sub processor 30, when it is ready to transfer object, checks for an available buffer area by using a NOTIFY command to be described later, and starts the control side DMA controller 34. The control side DMA controller 34 transfers the object data from the sub processor 30 to the graphic memory 10 in parallel with the transfer of the texture data, or when the graphic operation unit 40 is idle.

As above, the graphic processor 100 can obtain various types of data necessary for image processing from the main memory 50 at appropriate timings by using the image processing side DMA controller 28 which is provided inside the graphic processor 100. This can reduce the load on the graphic processor 100 and the main processor 200 with regard to data transfer processing, and makes it possible to perform the transfer processing in parallel with the processing of those processors except for a minimum amount of processing such as requesting a transfer. Moreover, it is possible to perform image processing corresponding to the processing of the fast-running main processor 200 without complicating the configuration of the graphic processor 100. This reduces the possibility of a halt or dropping frames of moving images or the like.

In the present embodiment, the commands to be analyzed and executed by the control unit 20 will be referred to as "non-graphic processing type commands." These non-graphic processing type commands do not explicitly describe the details of graphic processing in the graphic operation unit 40. They are of a command system that explicitly describes only the contents of processing such as a transfer of drawing data, a start of graphic processing, a wait for processing, a termination, or the like. The specific graphic processing of the graphic operation unit 40 is defined by the shader program and other programs that are designated by the configuration data.

Such non-graphic processing type commands have been adopted for the following purpose. In information processing apparatuses like the present embodiment, the graphic processors and shader programs to be executed therein are provided by hardware vendors while the application software and video contents to be executed by the information processing apparatuses are provided by software vendors. In such cases, the software vendors need not give consideration to the control of the graphic processors but only provide the data to be processed.

Nevertheless, since the required processing load and the like vary from one application to another, it is sometimes desirable that the graphic processing to be executed by the graphic processors be controlled by the software-vendor side if the overall efficiencies of the information processing apparatuses are taken into account. In addition, if the software vendors understand the hardware configuration of the graphic processors and have a certain degree of control over the graphic processing of the graphic processors, it is sometimes possible to contribute to increasing the speed and efficiency of the graphic processing.

In view of this, the commands that do not explicitly describe the method of graphic processing to be executed by the graphic operation unit 40, or "non-graphic processing type commands," are provided so as to allow easy control on the operation of the graphic processors.

Next, the non-graphic processing type commands will be described with reference to specific commands. In the present embodiment, the non-graphic processing type commands include a transfer command "DMA," a processing activation command "KICK," a processing completion notification command "NOTIFY," a synchronization command "SYNC," a wait command "WAIT," an end command "END," a next list command "NEXT," and a clocking command "PERF." It will be understood that the cases with some additional commands and without some of these commands also fall within the scope of the present invention.

All the non-graphic processing type commands mentioned above have the same format. FIG. 2 shows an example of the command format. The format 120 has data areas to respectively specify a type 121, an attribute 122, a command ID 123 and parameters 124 to 126: a type 121 is a number to specify a command among the above-described commands; an attribute 122 needs to be set differently command by command; a command ID 123 is given command by command; and parameters 124 to 126 represent necessary settings. The command length is 16 bytes, for example. The "command ID" starts with "1" and is incremented by "1." The command ID is used to identify each of a plurality of DMA commands or KICK commands included in a command list.

A set of a plurality of commands including KICK, DMA, and NOTIFY mentioned above is processed by the graphic processor 100. Hereinafter, this set is referred to as "command list." The execution part 26 of the control unit 20 executes commands in the command list one by one to cause the image processing side DMA controller 28 or the graphic operation unit 40 to execute corresponding instructions.

Figure 3:
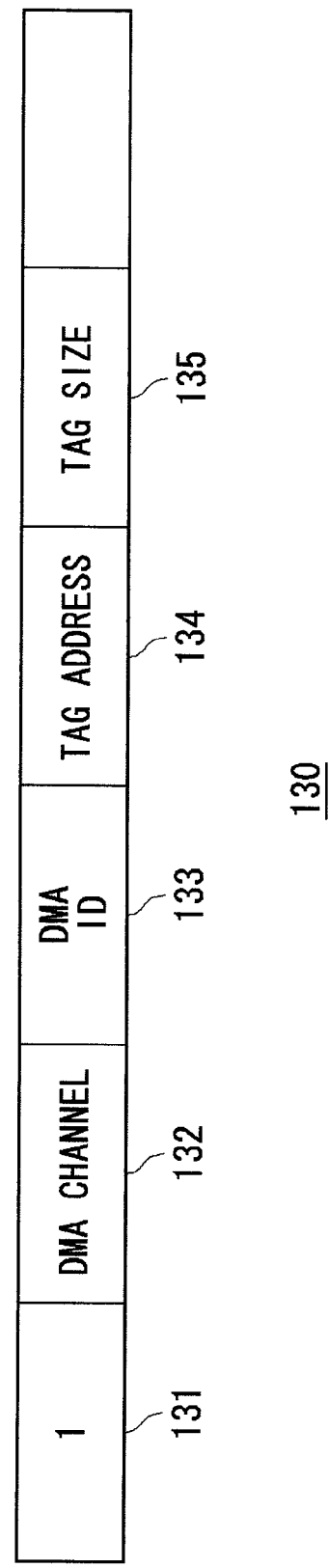
FIG. 3 is a diagram showing a data format of a DMA command.

FIG. 3 shows a data format 130 of the DMA command. The DMA command is a command for instructing the image processing side DMA controller 28 to perform a DMA transfer of arbitrary data between the main memory 50 and the graphic memory 10. When the execution part 26 of the control unit 20 executes the DMA command, the image processing side DMA controller 28 is activated and starts reading texture data from the main memory 50. The read data is stored in the buffers 12 of the graphic memory 10.

A type 131 is set to "1" to represent the DMA command. A DMA channel 132 specifies one of two channels so as to avoid conflict between devices that use DMA transfer. A DMA ID 133 specifies the ID of the DMA command. The DMA ID is written into the internal register 54 of the graphic processor 100 immediately after the DMA process is completed. The sub processors 30 can check for the end of the DMA process by polling the internal register 54 storing the DMA ID. A tag address 134 specifies the address of a DMA tag. The DMA tag includes information pertaining to the DMA transfer, i.e., an address, a DMA size, and the direction of transfer. A tag size 135 specifies the data size of the DMA tag.

Figure 4:
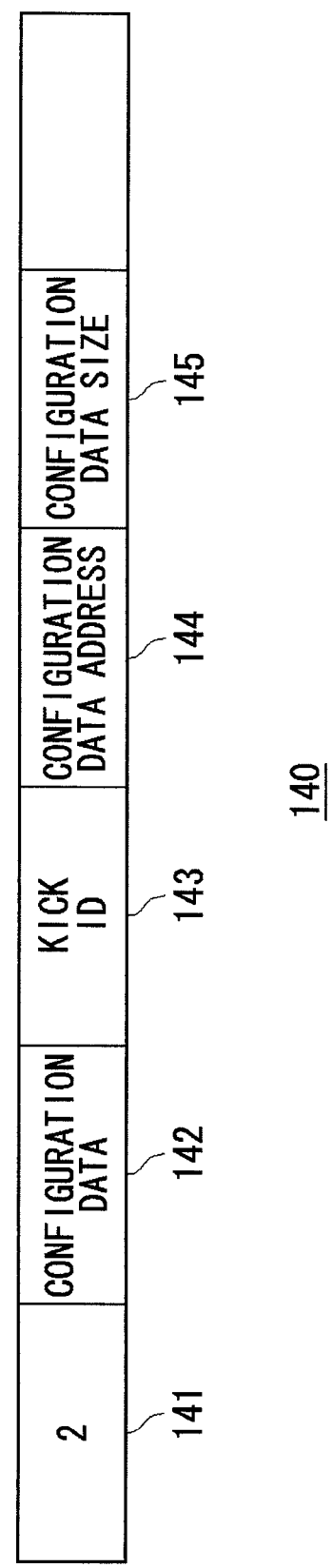
FIG. 4 is a diagram showing a data format of a KICK command.

FIG. 4 shows a data format 140 of the KICK command. The KICK command is a command for starting various types of graphic processing in the graphic operation unit 40. When the execution part 26 of the control unit 20 executes the KICK command, the graphic operation unit 40 accesses the graphic memory 10 to read texture data and object data, and draws them in the frame buffer.

A type 141 is set to "2" to represent the KICK command. A configuration tag 142 specifies whether or not to use configuration data. A KICK ID 143 specifies the ID of the KICK command. The KICK ID is written into the internal register 54 of the graphic processor 100 immediately after the KICK process is completed. The sub processors 30 can check for the end of the KICK process by polling the internal register 54 storing the KICK ID. A configuration data address 144 and a configuration data size 145 specify the address and data size of the configuration data, respectively. When the execution part 26 of the control unit 20 executes the KICK command, the configuration data is transferred to the graphic operation unit 40 before the graphic operation unit 40 is activated. The graphic operation unit 40 loads programs according to the contents of the configuration data, and then performs the graphic processing. The configuration data is determined in advance or created by the main processor 200.

Figure 5:
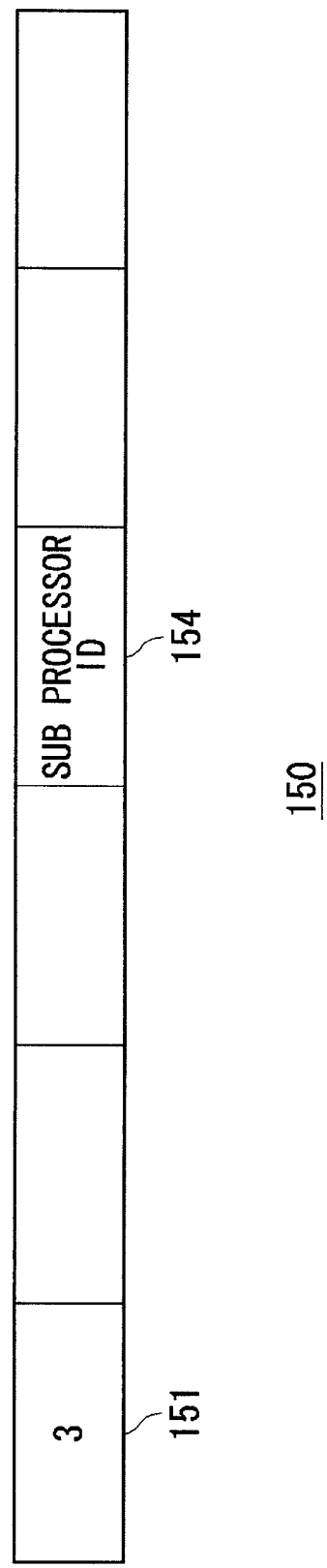
FIG. 5 is a diagram showing a data format of a NOTIFY command.

FIG. 5 shows a data format 150 of the NOTIFY command. The NOTIFY command is used to make a notification from the graphic processor 100 to the main processor 200. When the execution part 26 of the control unit 20 executes the NOTIFY command, the end of predetermined graphic processing in the graphic processor 100 is notified to the sub processors 30 in the main processor 200. Specifically, when the NOTIFY command is executed, the end of a DMA transfer by the image processing side DMA controller 28, or the end of graphic processing by the graphic operation unit 40 is notified to the sub-processor 30. Either the end of DMA transfer or the end of graphic processing is notified in the graphic processor 100 can be specified by the arrangement of the NOTIFY command and other commands in the command list.

A type 151 is set to "3" to represent the NOTIFY command. A sub processor ID 154 specifies a sub processor 30 to receive a notification signal. A sub processor ID 154 may specify all sub processors 30.

For example, the graphic memory has only a limited number of context buffers 12, which must be shared as areas for storing data necessary for graphic processing (such as texture data). Then, for example, the end of a DMA transfer necessary for graphic processing is notified to a sub processor 30 by using the NOTIFY command, so that the sub processor 30 transfers the result of geometry processing, such as vertex data, to the graphic memory 10 in response. This can reduce the idle time of the graphic operation unit 40 and the sub processor 30, thereby contributing to reduced operation time in consequence. As described above, the NOTIFY command is a command that is necessary for operating the graphic processor 100 and the main processor 200 in a coordinated manner to improve the processing efficiency of the entire information processing apparatus 1000. More specific usages of the NOTIFY command will be described in examples with reference to FIGS. 11 to 17.

Figure 6:
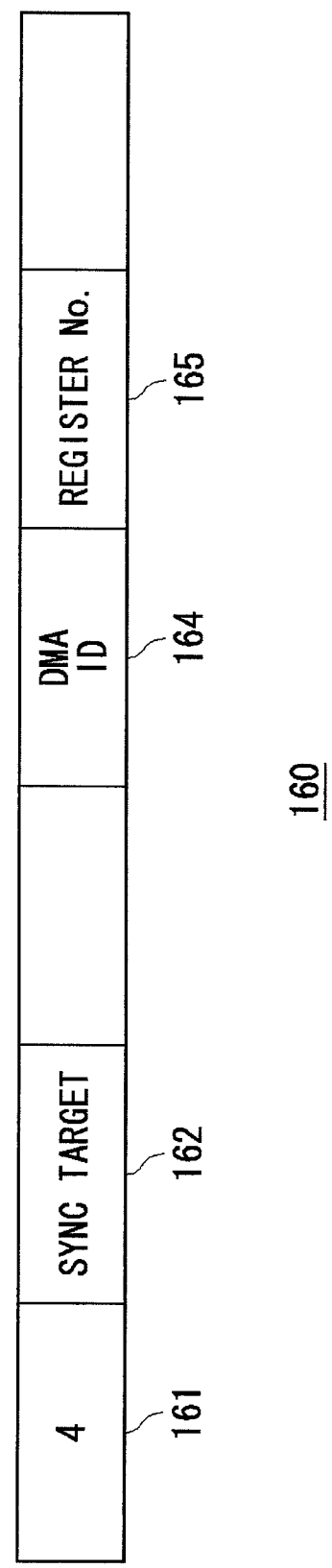
FIG. 6 is a diagram showing a data format of a SYNC command.

FIG. 6 shows a data format 160 of the SYNC command. The SYNC command is a command for synchronizing the end of a predetermined command process and the end of processing in a sub processor 30 when the multiple processes have dependency.

A type 161 is set to "4" to represent the SYNC command. A SYNC target 162 specifies a target to be checked for among the end of the DMA command, the end of the KICK command, or the end of the DMA transfer of an object from a sub processor. An ID 164 specifies the ID of the DMA command or the KICK command. A register 165 specifies a flag register. The sub processors 30 set flags on the internal register 54 when they complete their own processing. As will be described later, the SYNC command can be used to wait for the ends of transfer of both texture data and object data.

The execution part 26 refers to the internal register 54 to check for the end of the DMA command, the KICK command, or the sub processor. When the execution part 26 executes the SYNC command, a plurality of operations as described below occur depending on the process dependency specified by the format. Firstly, the graphic operation unit 40 is suspended from starting graphic processing that uses the data corresponding to a DMA command executed temporally in advance until the DMA transfer of the data is completed. Secondly, while the graphic operation unit 40 executes graphic processing by a KICK command executed temporally in advance, subsequent commands in the command list are suspended until the processing is completed. Thirdly, subsequent commands in the command list are suspended until data processing in the sub processor 30 is completed.

For example, when executing the KICK command, it is impossible to activate the graphic operation unit 40 unless texture data and other data necessary for graphic processing are ready on the graphic memory. In such cases, the ends of the DMA transfer processes of the texture data and object data can be checked by the SYNC command, and the KICK command can be executed in response. By this, the graphic processing is performed with efficiency. Moreover, the end of the graphic processing in the graphic operation unit 40 can be acquired by the SYNC command and the DMA command can be executed in response. By this, it is possible to reduce the idle time of the graphic operation unit 40.

As described above, the SYNC command can be used to synchronize the end of the DMA process or KICK process and the end of processing in the sub processor. Consequently, even if a plurality of commands having process dependency is included in the command list, it is possible to control the operation of the graphic processor 100 appropriately, and to coordinate the operations of the graphic processor 100 and the main processor 200. More specific usages of the SYNC command will be described in examples with reference to FIGS. 11 to 17.

It should be appreciated that the SYNC command may be used to check for the ends of one DMA command, one KICK command, or one sub processor. Moreover, two SYNC commands can be written in succession in the command list to synchronize the ends of a plurality of processes.

Unlike the SYNC command, the WAIT command (not-shown) keeps subsequent commands suspended until all the command processes executed on the graphic processor 100 are completed. A type is set to "5" to represent the WAIT command.

Figure 7:
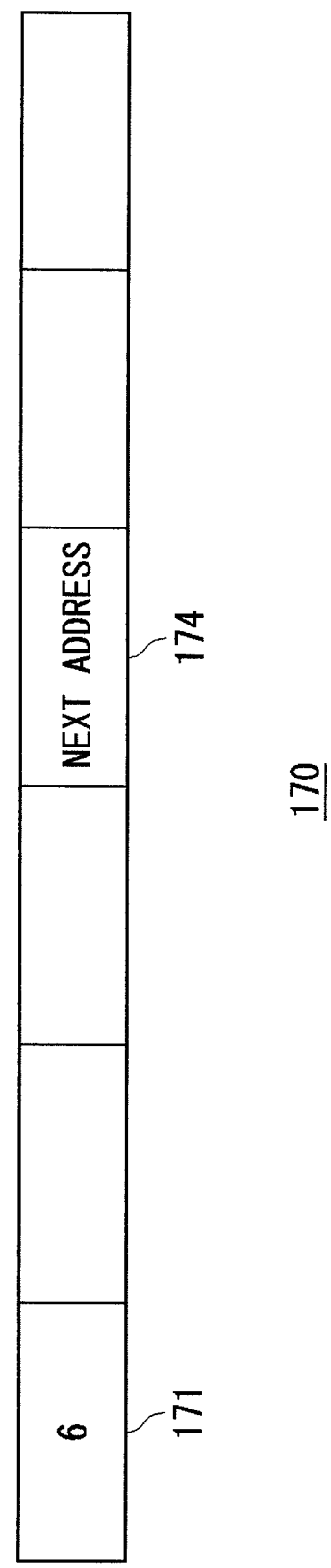
FIG. 7 is a diagram showing a data format of a NEXT command.

FIG. 7 shows a data format 170 of the NEXT command. The NEXT command is a command for indicating the end of one command list and indicating the address of a next command list to be executed. A type 171 is set to "6" to represent the NEXT command. A next address 174 specifies the address of top of the next command list to be executed.

In the present embodiment, a plurality of sub processors 30 perform processing on drawing data in parallel, and each of the sub processors 30 independently creates a command list which includes non-graphic processing type commands necessary for the graphic processing for the drawing data. The command lists are stored into the main memory 50 in order of creation. It is therefore impossible for the control unit 20 to recognize the execution order of those command lists. Then, the NEXT command is used to specify the address of the next command list to be executed so that the command list can be executed irrespective of the order of creation in the sub processors 30, and irrespective of location of the command list in the main memory 50.

The END command (not-shown) is a command for setting the end of a command list. When the execution part 26 executes the END command, control moves to the start address of a command list. The type number is set to "7."

Figure 8:
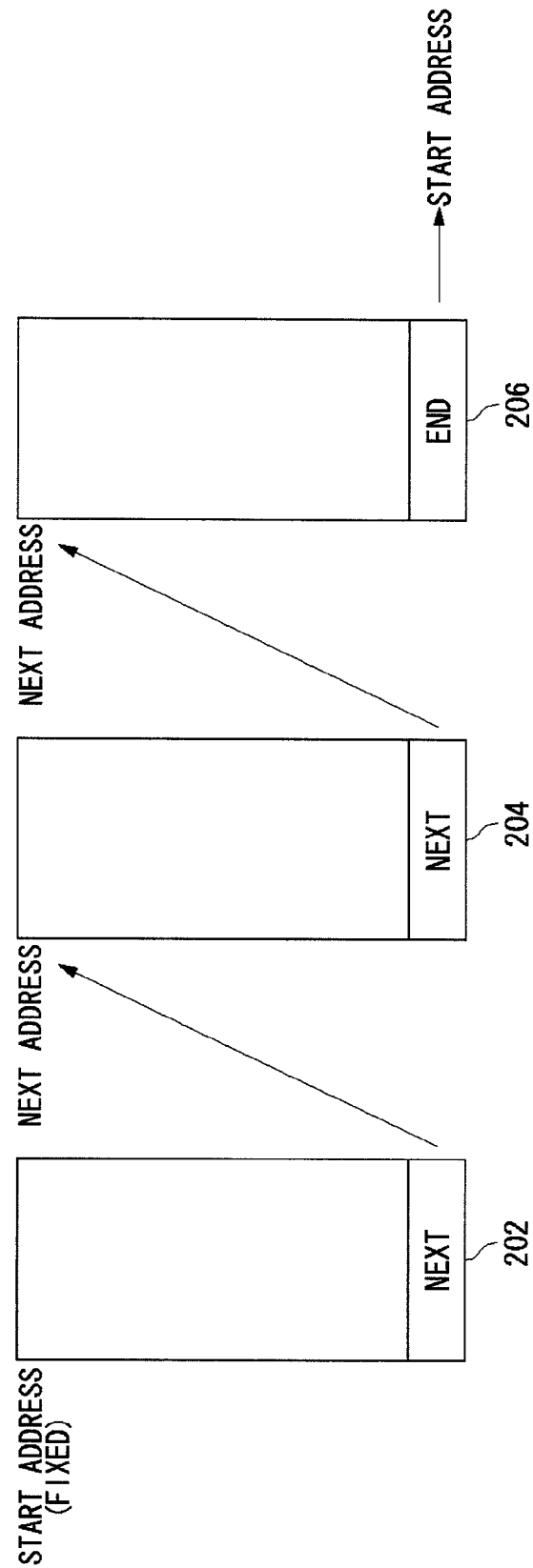
FIG. 8 is a diagram for explaining the NEXT command.

FIG. 8 is a diagram to illustrate how to use the NEXT command. Suppose, as shown in the diagram, that there are command lists 202, 204, and 206 to be executed in succession. These command lists are transferred to the main memory 50 irrespective of the order of execution. There is a NEXT command in the ends of the command lists 202 and 204, respectively. These NEXT commands describe the top addresses of the next command lists to be executed. There is an END command in the end of the command list 206.

The image processing side DMA controller 28 fetches the command list 202 that starts with a predetermined start address, from the main memory 50 as a first list. Then, according to the NEXT command of the command list 202, the image processing side DMA controller 28 can fetch the next command list 204 to be executed from the main memory 50. Similarly, according to the NEXT command of the command list 204, the image processing side DMA controller 28 can fetch the next command list 206 to be executed.

The management processor 32 is configured to analyze the command lists created by the respective sub processors 30, and insert necessary NEXT commands into the command lists. Otherwise, the sub processors 30 may be configured to exchange command lists with each other and insert necessary NEXT commands. When a sub processor A acquires an address on the memory, it locks the access to the main memory 50 by other sub processors. Then, the sub processor A stores its command list in the main memory 50 before the access to the main memory by the other sub processors is released. Subsequently, a sub processor B acquires the next address of the main memory, and adds a NEXT command including the next address to the command list created by the sub processor A. By repeating such process, necessary NEXT commands are inserted into the respective command lists.

The PERF command (not-shown) is a command for measuring the number of cycles for executing a command process. The type number is set to "9." When the execution part 26 of the control unit 20 executes the PERF command, the number of execution cycles on the graphic processor is measured in executing graphic processing according to a non-graphic processing type command. The number of execution cycles is counted, for example, based on the clock of the control unit 20. The PREF command is used primarily to provide a user with data such as the efficiency of graphic processing.

It should be noted that each of the non-graphic processing type commands, as described above, is a command that only pertains to the start or end of graphic processing or a DMA controller, and is not a command that directly manipulates the graphic processing in the graphic operation unit 40, i.e., a command that defines the details of processing.

Figure 9:
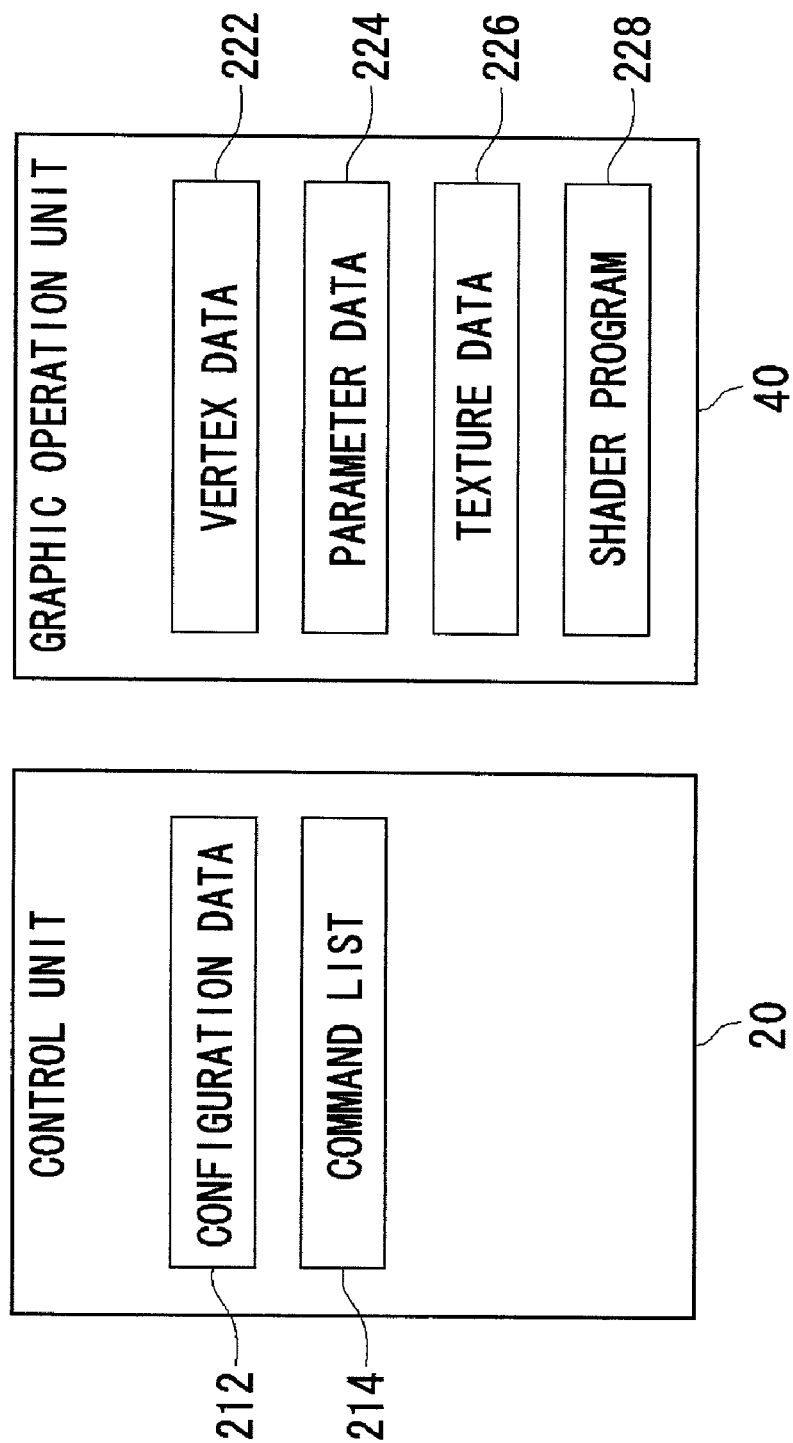
FIG. 9 is a diagram showing data to be DMA transferred in the information processing apparatus.

FIG. 9 shows data to be DMA transferred in the information processing apparatus 1000. These pieces of data can be classified into data used by the control unit 20 and data used by the graphic operation unit 40.

Configuration data 212 specifies the addresses of the shader program and the like. A command list 214 comprises non-graphic processing type commands described above. The control side DMA controller 34 controls the transfer of the configuration data 212, the command list 214, and vertex data 222. The configuration data 212 and the command list 214 are transferred to the memory area of the control unit 20 in the graphic processor 100. The vertex data 222 is transferred to the graphic memory 10. When the DMA transfer is performed by the control side DMA controller 34, memory allocation and buffer management at the destination are carried out by the main-processor side.

The image processing side DMA controller 28 controls the transfer of texture data 226, parameter data 224, and a shader program 228. The texture data 226 is transferred to the buffers 12 in the graphic memory 10. The parameter data 224 and the shader program 228 are transferred to the memory area of the graphic operation unit 40.

Next, the operation of the information processing apparatus 1000 according to non-graphic processing type commands will be described.

Figure 10:
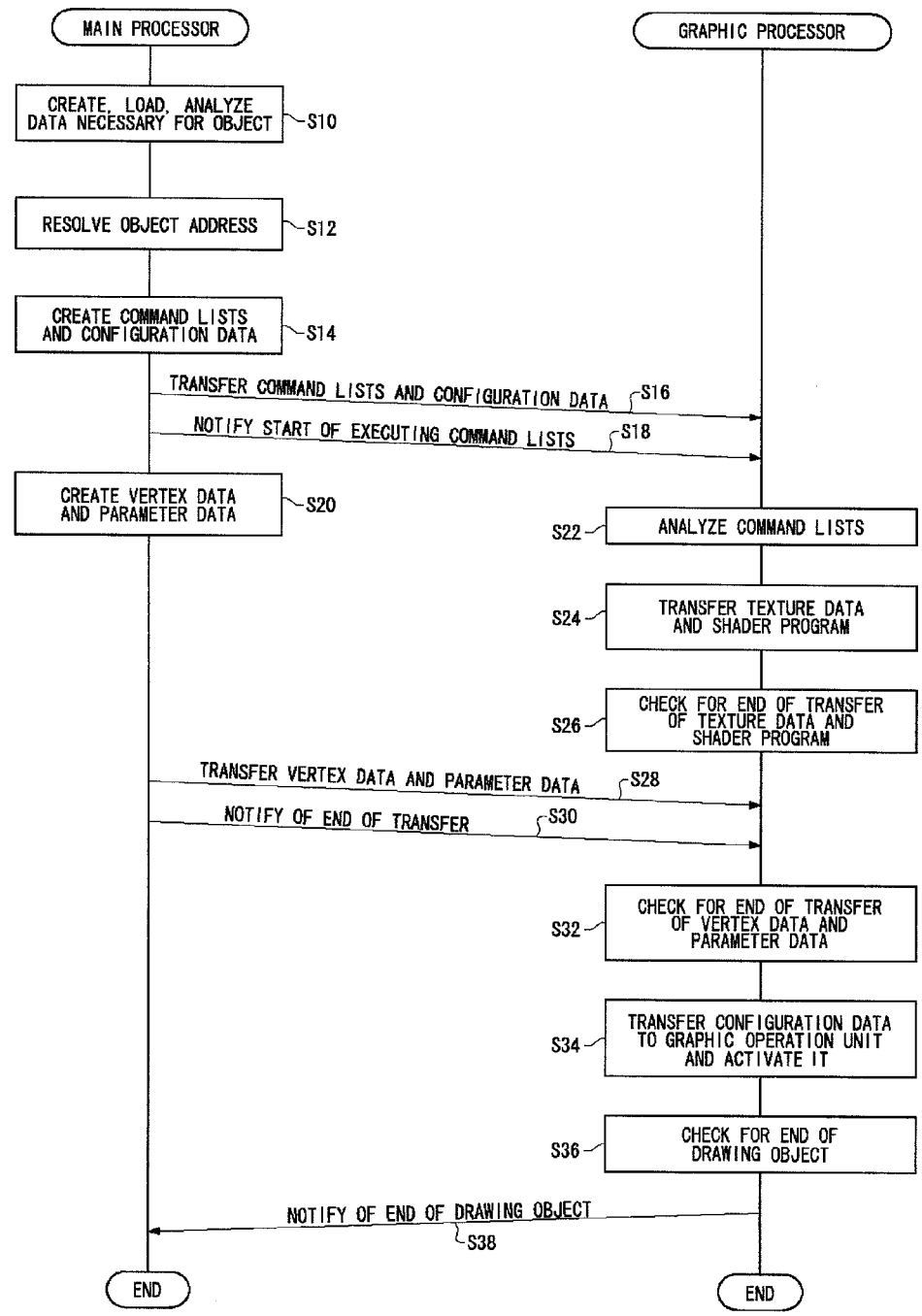
FIG. 10 is a flowchart for showing the coordinated operation of a main processor and a graphic processor when drawing an object.

FIG. 10 is a flowchart for showing the processing and data flow in the main processor 200 and the graphic processor 100 when drawing an object in the frame buffer. Now, each of the processes will be described with reference to FIG. 1.

The main processor 200 creates, loads, and analyzes data such as geometry data that is necessary for drawing the object (S10). The main processor 200 performs address resolution of the object to determine a data layout in the destination main memory 50 (S12), and stores it in the main memory 50. The main processor 200 then creates command lists and configuration data necessary for drawing the object (S14), and stores them in the main memory 50. The control side DMA controller 34 of the main processor 200 transfers the created command lists and configuration data to the control unit 20 of the graphic processor 100 (S16). When the transfer is completed, the main processor 200 notifies the control unit 20 to start executing the command lists (S18).

When the control unit 20 of the graphic processor 100 receives notification to start the execution of the command lists from the main processor 200, the command analysis part 24 in the control unit 20 starts analyzing the command lists (S22). When the execution part 26 executes a DMA command in the command list, the image processing side DMA controller 28 refers to the tag address of the DMA command and transfers texture data and other data necessary for drawing the object from the main memory 50 to the buffers 12 in the graphic memory 10 (S24). When the execution part 26 executes a SYNC command in the command list, the graphic operation unit 40 suspends the subsequent commands until the transfer of the texture data currently in operation according to S24 is completed (S26).

In the meantime, the main processor 200 performs geometry processing on the object to calculate vertex data and parameter data (S20), and stores them in the main memory 50. The control side DMA controller 34 of the main processor 200 transfers the vertex data to the graphic memory 10 (S28) and sets a flag on the internal register 54 to indicate that the geometry processing is completed (S30). In accordance with a SYNC command in the command list, the execution part 26 in the control unit 20 suspends the subsequent commands until the transfer of the vertex data is completed (S32). After the processing described so far, various types of data necessary for drawing the object are ready on the graphic memory 10.

When the execution part 26 executes a KICK command in this state, the control unit 20 transfers the configuration data to the graphic operation unit 40 so that the graphic operation unit 40 is activated to read the buffers 12 (S34). The graphic operation unit 40 reads a program based on the configuration data. When the processing in the graphic operation unit 40 ends and the drawing of the object in the frame buffer is completed, the graphic operation unit 40 sets a flag on the internal register 54 to indicate that the KICK process is completed. The graphic operation unit 40 checks for the end of drawing of the object with the SYNC command (S36), and notifies the sub processor 30 of the end of drawing of the object with a NOTIFY command (S38). This notification allows the main processor 200 to start preparing for the next object.

In the information processing apparatus 1000, the geometry processing in the sub processors 30, the DMA transfers of the object data and texture data, and the graphic processing in the graphic operation unit 40 need to be synchronized with each other. Therefore, command lists must be created in consideration of the processing procedure and processing speed of both the control side DMA controller 34 and the image processing side DMA controller 28. Hereinafter, referring to examples of command lists, a description will be given of coordinated operation of the main processor 200 and the graphic processor 100 according to the command list.

In the following description, the image processing side DMA controller 28 shall be capable of two simultaneous DMA transfers of texture data, and the graphic operation unit 40 shall be capable of only the single process of drawing an object. Furthermore, the graphic memory 10 shall be provided with buffers A and B as the context buffers 12 for storing texture data.

FIG. 11 shows a command list 700 as an example of a command list. It should be appreciated that while commands are interpreted as listed, actual processing will not always occur in the order of the commands but may shift ahead and behind depending on the amount of data to be DMA transferred and the time necessary for graphic processing.

In FIG. 11, "TYPE" shows the command name, and "ATTRIBUTE" shows the targets to be synchronized by the SYNC command in abbreviations. "D" represents a DMA process, "F" represents geometry processing of a sub processor, and "K" represents a KICK process. "ID" is the DMA ID or KICK ID mentioned above. This ID makes it possible to identify the process to be suspended out of a plurality of DMA processes or KICK processes. "Tex" in the diagram represents a texture, "Obj" represents an object, and "SPU" represents a sub processor. The symbols A and B indicate two buffers 12. For example, "Obj A" represents an object to be DMA transferred to the buffer A. "Tex A" represents texture data that is necessary for graphic processing of an object A and is DMA transferred to the buffer A. It should be appreciated that, although actual graphic processing also requires color data, a value data, and the like aside from texture data, texture data is shown as a representative. "SPU A" represents a sub processor that processes the object A to be DMA transferred to the buffer A.

The execution part 26 executes the command list 700 from the start address successively. The DMA command 701 having an ID of "1" and the DMA command 702 having an ID of "2" are executed. As a result, the image processing side DMA controller 28 starts transferring a texture A (Tex A) from the main memory 50 to the buffer A, and starts transferring a texture B (Tex B) to the buffer B.

In parallel with the DMA transfer of the texture A to the buffer A, the control side DMA controller 34 transfers an object A (Obj A) from the sub processor A to the graphic memory 10. In parallel with the DMA transfer of the texture B to the buffer B, the control side DMA controller 34 transfers an object B (Obj B) from the sub processor B to the graphic memory 10. It should be noted that the control side DMA controller 34 operates independently of the command execution by the execution part 26.

In accordance with the SYNC command 703, the graphic operation unit 40 checks for the end of transfer of the texture A to the buffer A, corresponding to the DMA command 701 having the ID of "1," and the end of transfer of the object A from the sub processor A (SPU A) to the graphic memory 10 by the control side DMA controller 34. In accordance with the KICK command 704 having an ID of "1," the graphic operation unit 40 makes a read access to the buffer A and starts graphic processing on the object A.

Then, in accordance with the SYNC command 705, the graphic operation unit 40 checks for the end of transfer of the texture B to the buffer B, corresponding to the DMA command 702 having the ID of "2," and the end of transfer of the object B from the sub processor B (SPU B) to the graphic memory 10 by the control side DMA controller 34. In accordance with the KICK command 706 having an ID of "2," the graphic operation unit 40 makes a read access to the buffer B and starts graphic processing on the object B.

In accordance with the SYNC command 707, the graphic operation unit 40 checks for the end of the graphic processing on the object A corresponding to the KICK command 704 having the ID of "1." The object A subjected to the graphic processing is written to the frame buffer of the graphic memory 10. With the NOTIFY command 708, the graphic operation unit 40 notifies the sub processor A (SPU A) that the graphic processing on the object A is completed. Thereby the sub processor A is informed that the buffer A is available.

In accordance with the DMA command 709 having an ID of "3," the image processing side DMA controller 28 starts transferring a texture A, which is necessary for graphic processing of a new object A, to the available buffer A.

In parallel with the DMA transfer of the texture A to the buffer A, the control side DMA controller 34 DMA transfers the object A from the sub processor A to the graphic memory 10.

In accordance with the SYNC command 710, the graphic operation unit 40 checks for the end of transfer of the texture A to the buffer A, corresponding to the DMA command 709 having the ID of "3," and the end of transfer of the object A from the sub processor A to the graphic memory 10. In accordance with the KICK command 711 having an ID of "3," the graphic operation unit 40 makes a read access to the buffer A and performs graphic processing on the object A.

In accordance with the SYNC command 712, the graphic operation unit 40 checks for the end of the graphic processing on the object B which corresponds to the KICK command 706 having the ID of "2." The object B subjected to the graphic processing is written to the frame buffer of the graphic memory 10. With the NOTIFY command 713, the graphic operation unit 40 notifies the sub processor B that the graphic processing on the object B is completed.

In accordance with the DMA command 714 having an ID of "4," the image processing side DMA controller 28 starts transferring a texture B, which is necessary for graphic processing of a new object B, to the available buffer B.

In parallel with the DMA transfer of the texture B to the buffer B, the control side DMA controller 34 transfers the object B from the sub processor B to the graphic memory 10.

In accordance with the SYNC command 715, the graphic operation unit 40 checks for the end of transfer of the texture B to the buffer B, corresponding to the DMA command 714 having the ID of "4," and the end of transfer of the object B from the sub processor B to the buffer B. In accordance with the KICK command 716 having an ID of "4," the graphic operation unit 40 makes a read access to the buffer B and starts graphic processing on the object B.

When the execution part 26 executes the WAIT command 717, the graphic operation unit 40 waits for the end of the second graphic processing on the object A and the object B, and notifies all the sub processors of the end of the graphic processing with the NOTIFY command 718.

Figure 12:
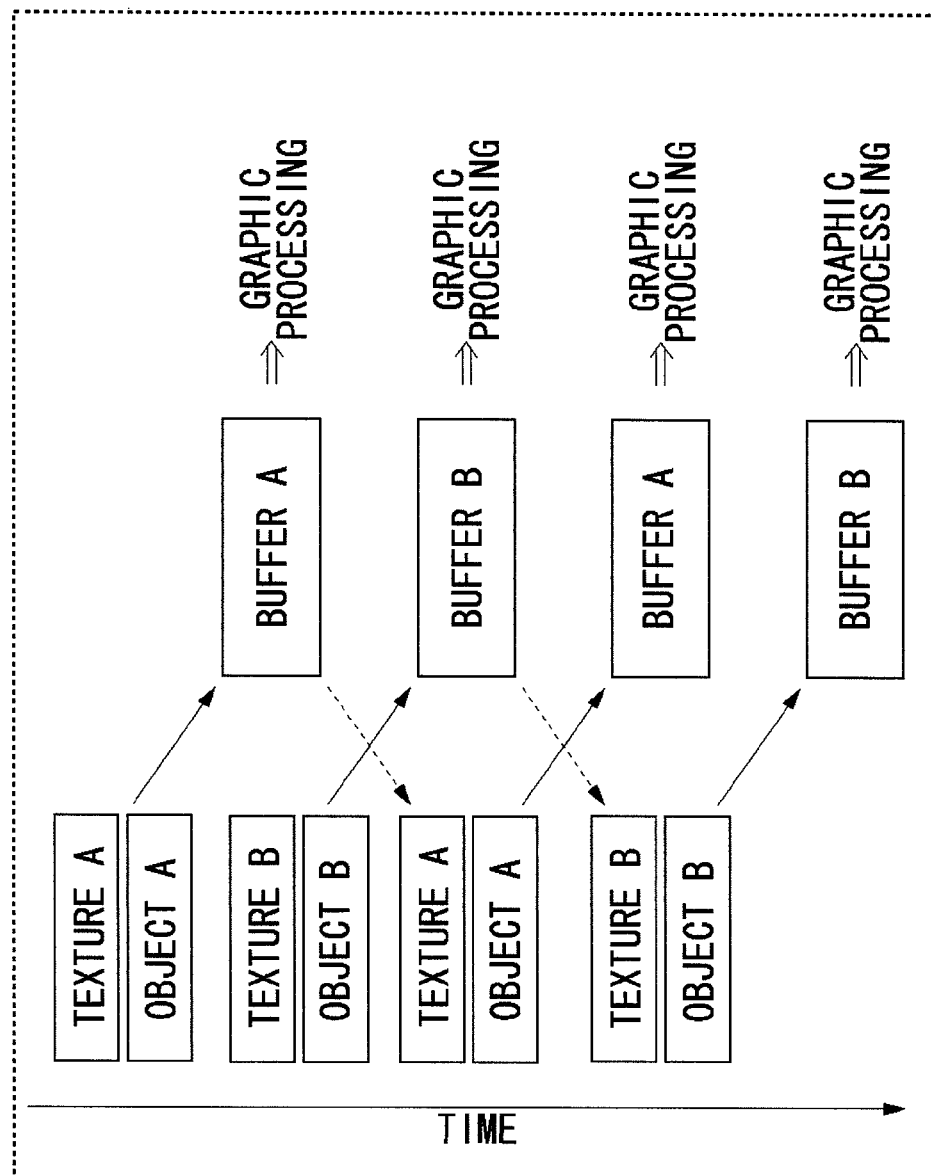
FIG. 12 is a diagram schematically showing the transfer of texture data according to the command list of FIG. 11.

FIG. 12 schematically shows the transfer of texture data in accordance with the command list 700 shown in FIG. 11. While the texture A is transferred to the buffer A in accordance with a DMA command, the object A is transferred from the sub processor to the graphic memory in parallel. When the transfers of both the texture A and the object A are completed, the graphic operation unit 40 performs graphic processing on the object A. Then, while the texture B is transferred to the buffer B in accordance with a DMA command, the object B is transferred from the sub processor to the graphic memory in parallel. When the transfers of both the texture B and the object B are completed, the graphic operation unit 40 performs graphic processing on the object B. Subsequently, above-described processes are repeated.

Figure 13:
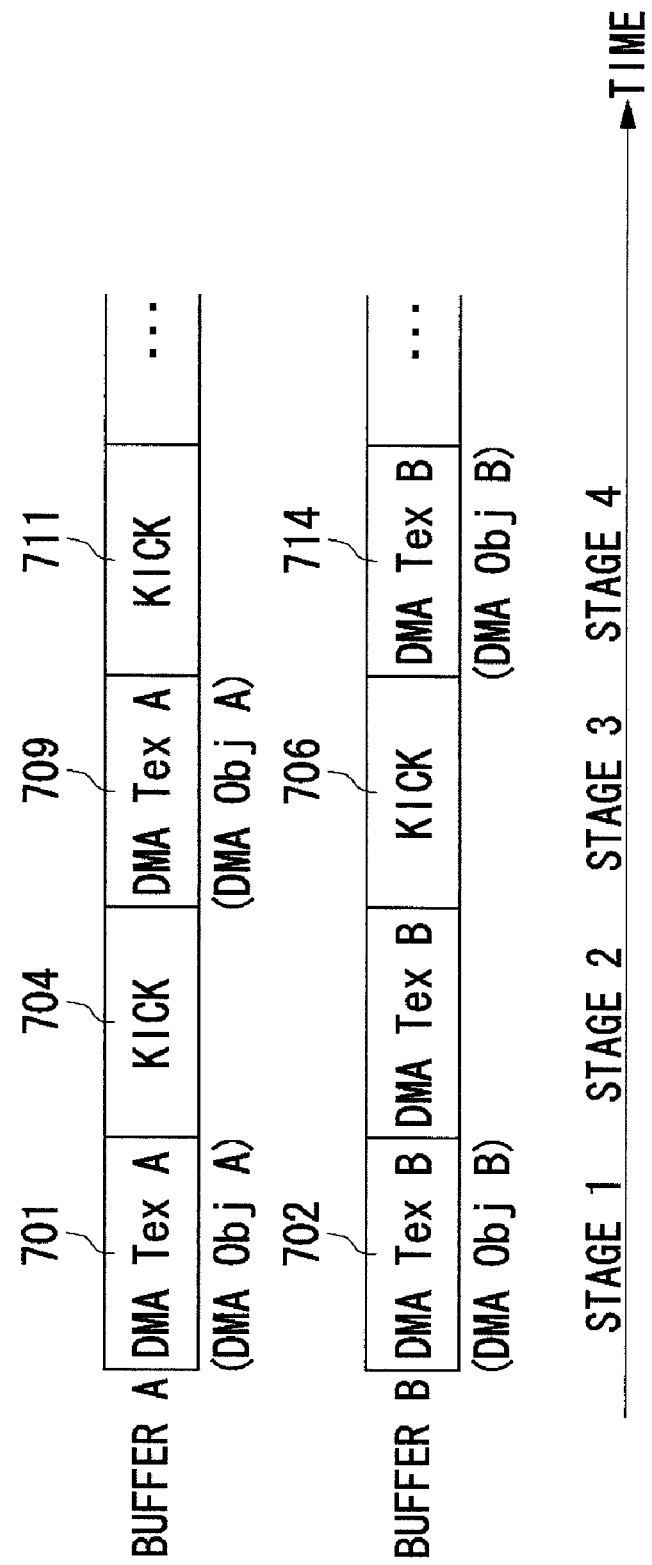
FIG. 13 is a chart showing the states of the buffers when following the command list of FIG. 11.

FIG. 13 is a chart for showing the states of the buffers A and B when following the command list 700 shown in FIG. 11. The symbols in the chart correspond to the symbols given to the commands in the command list shown in FIG. 11. The texture A necessary for processing the object A is transferred from the main memory 50 to the buffer A (701), and the texture B necessary for processing the object B is transferred from the main memory 50 to the buffer B (702). When the end of transfer of the object A and the texture A are checked for by the SYNC command, the KICK command causes the graphic operation unit 40 to read them from the buffer A, and graphic processing is started (704). Subsequently, the DMA transfer to the buffers A and B by the DMA commands and the reading from the buffers A and B by the KICK commands are repeated in turn.

For the sake of simplicity, FIG. 13 is depicted as if processes on all stages end at the same time. It should be appreciated, however, that actual process can shift ahead and behind depending on the amounts of data to be transferred and the time necessary for graphic processing.

As described above, according to the embodiment, the order of graphic processing in the graphic processor can be controlled by creating command lists with non-graphic processing type commands.

According to the present embodiment, the user can control the cooperated operation of the main processor 200 and the graphic processor 100 with non-graphic processing type commands.

According to the non-graphic processing type commands of the present embodiment, a small number of simple commands for the control unit 20 can be combined to control the operation of the graphic operation unit. These non-graphic processing type commands are free from the influence of programs, such as shader programs, for performing graphic processing since they do not designate any specific graphic processing in the graphic operation unit.

Instead of the non-graphic processing type commands, direct and detailed commands for the processing of the graphic operation unit may be provided for application software developers. This may increase the burden, however, of supporting commands when the graphic operation unit is modified in hardware configuration. Such a burden can be reduced since the non-graphic processing type commands according to the present embodiment are small in number, and are limited to ones pertaining to the basic operations of the graphic operation unit.

The non-graphic processing type commands also make it possible for the user to specify buffer allocations. This eliminates the need for the main processor to perform buffer allocation, thereby reducing the processing load on the main processor.

In the information processing apparatus 1000, the main processor 200 has a plurality of sub processors 30 and can thus perform geometry processing on objects in a parallel fashion, while the graphic processor 100 can only perform graphic processing on a single object. Thus, according to the present embodiment, command lists are created such that the graphic processing on the graphic operation unit to be activated by the KICK command has an operation time generally equal to the time of a data transfer to be started by the DMA command. The drawing data is transferred at timing appropriate to the graphic processor 100. By this, the load balance between the main processor and the graphic processor is improved, enhancing the processing efficiency of the information processing apparatus 1000.

In other words, since the main-processor has a higher processing speed than the graphic processor in the information processing apparatus 1000, it is possible to accelerate the processing of the information processing apparatus by reducing the time period for the main processor to wait for the end of graphic processing in the graphic operation unit as much as possible.

For example, consider the case of drawing a large-size frame. In this case, performing graphic processing on the entire frame increases the period of time for the sub processors to wait for the end of processing of the graphic operation unit since the amount of operation is extremely high. Thus, the frame is split into four, and a command list is created such that the time for transferring data necessary for drawing each of the split frames, the time for performing the geometry processing on an object in each frame, and the time for performing graphic processing on each split frame are balanced. By this process, the image processing time can be reduced. As described above, the information processing efficiency can be increased depending on how command lists are designed.

The invention has been described in conjunction with the embodiment thereof. The foregoing embodiment has been given solely by way of illustration. It should be understood by those skilled in the art that various modifications may be made to combinations of the foregoing components and processes, and all such modifications are also intended to fall within the scope of the present invention. Now, such modifications will be described.

Specific embodiment has been described where the graphic operation unit 40 performs graphic processing on a single object. However, the graphic operation unit 40 may be configured so that it can perform graphic processing on a plurality of different objects in parallel.

Figure 14:
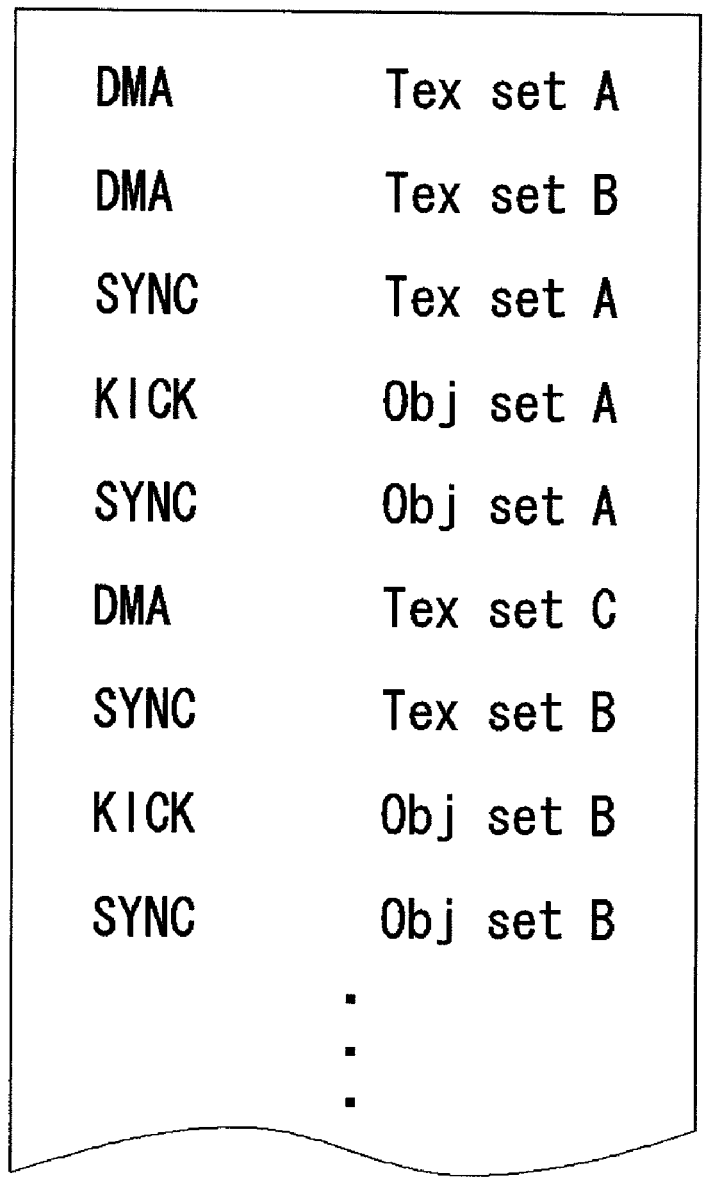
FIG. 14 is a diagram showing an example of a command list when the graphic operation unit can perform graphic processing on a plurality of objects in parallel.

FIG. 14 shows an example of a command list 750 in such a case, using non-graphic processing type commands. In FIG. 14, a set of textures necessary for graphic processing on a set of a plurality of objects "Obj set A" will be expressed as "Tex set A." DMA commands for DMA-transferring texture sets, SYNC commands for checking for the end of transfer of the texture sets and corresponding object sets, and KICK commands for instructing the start of drawing of the object sets after the end of transfer are arranged in the command list 750 as is the case with a single object. This makes it possible to control the graphic processing in the graphic operation unit 40 as is the case with a single object even if there is a plurality of objects to be processed.

In the information processing apparatus 1000 according to the embodiment, the graphic processor 100 and the main processor 200 may be integrated as a single LSI chip or formed as separate chips. Each of the blocks shown in the embodiment shall not be limited to that degree of integration. Any combinations of the components may be integrated in a single chip or formed as separate chips.

While specific embodiment has been described where the main processor 200 is a multiprocessor, the present invention may also be applied to a single processor. Moreover, the graphic processor 100 may be configured as a multiprocessor, and the present invention may be applied to each of the processors to achieve the coordinated operation with the main processor 200.

Specific embodiment has been described where the graphic memory has two context buffers. However, the graphic memory may have three or more context buffers, thereby further reducing the idle time of the graphic operation unit.

While specific embodiment has been made where the graphic memory 10 is provided outside the graphic processor 100, the graphic memory may also be formed inside the graphic processor 100. It is also possible to omit the separate graphic memory and use part of the area of the main memory 50 as the graphic memory.

Instead of using the NOTIFY command to notify the sub processors of the end of graphic processing on objects, flags may be set on the internal register 54 to indicate the end of graphic processing. Then, the main processor 200 may be configured to poll the internal register 54. This makes it possible for the main processor 200 to be informed of the end of the graphic processing on objects without the use of the NOTIFY command. The NOTIFY command may cause some time lag. The internal register is used if the main processor 200 does not allow the time lag, or if it is desired to check for the end of graphic processing at timing convenient to the processor. The internal register 54 and the NOTIFY command may also be used in combination. In this case, the sub processors 30 may select either polling or the NOTIFY command depending on the situation.

The destination to which the end of graphic processing is notified by using the NOTIFY command is not limited to the main processor 200. The destination may be any processor outside the graphic operation unit 40.

The embodiment has dealt with the case where the image processing side DMA controller 28 is in charge of the DMA transfer of data necessary for graphic processing, such as texture data and parameter data, and the control side DMA controller 34 is in charge of the DMA transfer of the others such as configuration data, command lists, vertex data, and a shader program. However, the foregoing is just a representative example. The control side DMA controller 34 may take charge of the DMA transfer of all the data. Otherwise, the image processing side DMA controller 28 may take charge of the same. When the control side DMA controller 34 is in charge of the transfer of texture data and parameter data, the execution part 26 issues a DMA transfer instruction to the control side DMA controller 34 when executing the DMA command.

Specific embodiment has been made where the execution part 26 of the control unit 20 executes command lists in order from the top. However, the command analysis part 24 may rearrange the commands when it analyses the command lists. For example, the command analysis part 24 executes a PERF command at appropriate timing to acquire the numbers of execution cycles of the DMA command and the KICK command. If the two commands have significantly different numbers of execution cycles, DMA commands and KICK commands in the command lists can be changed in position to improve the processing efficiency of the graphic processor 100.

The command analysis part 24 may also be configured to correct an arrangement error in a command list if it finds the error in analyzing the command list. For example, the command analysis part 24 may refer to the IDs in the SYNC command and finds that the SYNC command lies in front of the DMA command or KICK command. In this case, the command analysis part 24 may be configured so that it rearranges a SYNC command to come after a DMA command or KICK command. Moreover, when the command list includes a DMA command and a KICK command, the command analysis part 24 may search the command list based on IDs given to the respective commands. Then, if the command list has no SYNC command for synchronizing the commands, the command analysis part 24 may also be configured to add SYNC command(s) to the command list.

INDUSTRIAL APPLICABILITY

According to the present invention, the operation of the graphic processor for performing image processing can be controlled with a small number of commands.

The invention claimed is:

1. A graphic processor comprising:
a control unit which exercises centralized control on the graphic processor; and
a graphic unit which performs graphic processing in accordance with a program given through the control unit,
wherein the control unit includes:
an interface part which receives data from an external unit, wherein the data at least comprises a program specifying graphic operation procedures in the graphic unit and a command system including a set of non-graphic processing type commands pertaining to operations other than the graphic operation in the graphic unit, the interface part sending the program to the graphic unit,
wherein the non-graphic processing type commands are selected from the group consisting of a transferring command, a processing activation command, a processing completion notification command, a synchronization command, a wait command, an end command, a next list command, and a clocking command,
a command analysis part which analyzes the command system including the set of non-graphic processing type commands, and
an execution part which executes the analyzed non-graphic processing type commands,
wherein said set of non-graphic processing type commands is given to the interface part as a command list in which non-graphic processing type commands have been combined to control the operation of the graphic unit by a user, and
wherein all of the non-graphic processing type commands have the same format.

2. The graphic processor according to claim 1, wherein the command system is a system which encapsulates and handles graphic processing to be performed by the graphic unit.

3. The graphic processor according to claim 1, wherein the command system comprises global operation instructing commands which are independent of details of the graphic processing to be performed by the graphic unit.

4. The graphic processor according to claim 1, wherein the command analysis part transfers data necessary for graphic processing out of the data received from the external unit to a storage area accessible by the graphic unit.

5. The graphic processor according to claim 1, wherein the command system includes a processing activation command, and the execution part causes the graphic unit to start graphic processing in accordance with the processing activation command.

6. The graphic processor according to claim 1, wherein the command system includes a synchronization command, and the execution part suspends execution of the subsequent commands until a data transfer from the external unit is completed in accordance with the synchronization command.

7. The graphic processor according to claim 1, wherein the command system includes a synchronization command, and the execution part suspends execution of the subsequent commands until graphic processing of the graphic unit ends in accordance with the synchronization command.

8. The graphic processor according to claim 1, wherein the command system includes a synchronization command, and the execution part suspends execution of the subsequent commands until processing of an external processor ends in accordance with the synchronization command.

9. The graphic processor according to claim 5, wherein the command system includes a synchronization command, and the execution part suspends execution of the graphic processing activation command until data necessary for performing a predetermined unit of graphic processing of the graphic unit becomes ready in accordance with the synchronization command.

10. The graphic processor according to claim 1, wherein the command system includes a transfer command, and reading data from the external unit to the graphic unit is performed when the execution part executes the transfer command.

11. The graphic processor according to claim 10, further comprising a DMA controller which executes a transfer command, wherein when the execution part executes the transfer command, the DMA controller is activated to read data from the external unit to the graphic unit.

12. The graphic processor according to claim 1, wherein the command system includes a processing completion notification command, and when the execution part executes the processing completion notification command, the end of predetermined processing in the graphic processor is notified to the external unit.

13. The graphic processor according to claim 1, wherein if processing in accordance with a plurality of non-graphic processing type commands is handled as a single list and there are a plurality of lists to be executed in succession, the command system includes a next list command for specifying a next list to be executed, and the next list is executed from the top when the execution part executes the next list command.

14. The graphic processor according to claim 1, wherein the command system includes a clocking command for measuring the number of execution cycles required for the graphic processor to perform graphic processing in accordance with a non-graphic processing type command, and the number of execution cycles is measured when the execution part executes the clocking command.

15. A graphic processor comprising:
a control unit which exercises centralized control on the graphic processor;
a graphic unit which performs graphic processing in accordance with a program given through the control unit; and
a DMA controller which executes a transfer command,
wherein the control unit includes:
an interface part which receives data from an external unit, wherein the data at least comprises a program specifying graphic operation procedures in the graphic unit and a command system including a set of non-graphic processing type commands pertaining to a start or end of the graphic unit and the DMA controller, the interface part sending the program to the graphic unit,
wherein the non-graphic processing type commands are selected from the group consisting of a transferring command, a processing activation command, a processing completion notification command, a synchronization command, a wait command, an end command, a next list command, and a clocking command,
a command analysis part which analyzes the command system including the set of non-graphic processing type commands, and
an execution part which executes the analyzed non-graphic processing type commands,
wherein said set of non-graphic processing type commands is given to the interface part as a command list in which non-graphic processing type commands have been combined to control the operation of the graphic unit by a user, and
wherein all of the non-graphic processing type commands have same the format.

16. An information processing apparatus comprising:
a main processor which exercises centralized control on the entire apparatus; and
a graphic processor which performs an image processing operation,
wherein the graphic processor includes a control unit which exercises centralized control on the graphic processor, and a graphic unit which performs graphic processing in accordance with a program given through the control unit,
wherein the control unit includes:
an interface part which receives data from the main processor, wherein the data at least comprises a program specifying graphic operation procedures in the graphic unit and a command system including a set of non-graphic processing type commands pertaining to operations other than the graphic operation in the graphic unit, the interface part sending the program to the graphic unit,
wherein the non-graphic processing type commands are selected from the group consisting of a transferring command, a processing activation command, a processing completion notification command, a synchronization command, a wait command, an end command, a next list command, and a clocking command,
a command analysis part which analyzes the command system including the set of non-graphic processing type commands, and
an execution part which executes the analyzed non-graphic processing type commands,
wherein said set of non-graphic processing type commands is given to the interface part as a command list in which non-graphic processing type commands have been combined to control the operation of the graphic unit by a user,
wherein all of the non-graphic processing type commands have the same format.

17. The information processing apparatus according to claim 16, wherein the command system includes a processing completion notification command, and the execution part executes the processing completion notification command to notify the main processor of the end of predetermined processing of the graphic processor.

18. The information processing apparatus according to claim 17, wherein the graphic processor further includes an internal register whose status changes in response to the end of the predetermined processing.

19. The information processing apparatus according to claim 16, wherein:
the main processor includes a management unit and a plurality of operation units;
each of the operation units creates a list of processing with a plurality of non-graphic processing type commands;
the management unit adds a next list command to the lists created by the respective operation units, the next list command explicitly describing an order of execution of the lists; and
when the execution part executes the next list command, a next list is executed from the top.

20. An information processing apparatus comprising:
a main processor which exercises centralized control on the entire apparatus; and
a graphic processor which performs an image processing operation,
wherein the graphic processor includes a control unit which controls the graphic processor so as to coordinate the main processor and the graphic processor during operation, and a graphic unit which performs graphic processing in accordance with a program given through the control unit;
the control unit includes:
an interface part which receives data from the main processor, wherein the data at least comprises a program specifying graphic operation procedures in the graphic unit and a command system including a set of non-graphic processing type commands pertaining to operations other than the graphic operation in the graphic unit, the interface part sending the program to the graphic unit,
wherein the non-graphic processing type commands are selected from the group consisting of a transferring command, a processing activation command, a processing completion notification command, a synchronization command, a wait command, an end command, a next list command, and a clocking command,
a command analysis part which analyzes the command system including the set of non-graphic processing type commands, and
an execution part which executes the analyzed non-graphic processing type commands,
wherein said set of non-graphic processing type commands is given to the interface part as a command list in which non-graphic processing type commands have been combined to control the operation of the graphic unit by a user,
wherein all of the non-graphic processing type commands have the same format.

21. The information processing apparatus according to claim 20, wherein a command for coordinating the graphic processor with the main processor is given from the main processor to the control unit.

22. A graphic processor comprising:
a control unit which exercises centralized control on the graphic processor; and
a graphic unit which performs graphic processing in accordance with a program given through the control unit,
wherein the control unit includes:
an interface part which receives data from an external unit, wherein the data at least comprises a program specifying graphic operation procedures in the graphic unit and a command system including a set of non-graphic processing type commands pertaining to operations other than the graphic operation in the graphic unit, the interface part sending the program to the graphic unit,
wherein the non-graphic processing type commands are selected from the group consisting of a transferring command, a processing activation command, a processing completion notification command, a synchronization command, a wait command, an end command, a next list command, and a clocking command,
a command analysis part which analyzes the command system including the set of non-graphic processing type commands, and
an execution part which executes the analyzed non-graphic processing type commands,
wherein said set of non-graphic processing type commands is given to the interface part as a command list in which non-graphic processing type commands have been combined to control the operation of the graphic unit by a user,
wherein all of the non-graphic processing type commands have the same format.

* * * * *